United States Patent [19]

Otstot et al.

[11] Patent Number: 4,686,039

[45] Date of Patent: Aug. 11, 1987

[54] FLUID SEPARATION MODULE

[75] Inventors: Roger S. Otstot, Raleigh, N.C.; Duane E. King, St. Louis, Mo.

[73] Assignee: Monsanto Company, St. Louis, Mo.

[21] Appl. No.: 813,753

[22] Filed: Dec. 26, 1985

[51] Int. Cl.⁴ ............................................. B01D 13/01
[52] U.S. Cl. .............................. 210/321.1; 210/433.2; 55/158
[58] Field of Search ............... 210/321.1, 321.2, 321.3, 210/321.4, 323.2, 433.2; 55/158; 422/48

[56] References Cited

U.S. PATENT DOCUMENTS

| | | | |
|---|---|---|---|
| 3,760,949 | 9/1973 | Carey et al. | 210/321.1 |
| 4,334,993 | 6/1982 | Norton | 210/321.3 |
| 4,414,110 | 11/1983 | Geel et al. | 210/321.3 |

*Primary Examiner*—David Sadowski
*Assistant Examiner*—Jeffrey W. Peterson
*Attorney, Agent, or Firm*—H. Croskell

[57] ABSTRACT

Fluid separation modules are disclosed having tube sheets positioned in the end portions of the cylindrical shell forming the exterior of the separation module wherein the end portions of the cylindrical shell have been modified in order to provide improved adhesion and fluid seal between the tube sheets and the shell walls.

8 Claims, 2 Drawing Figures

FLUID SEPARATION MODULE

BACKGROUND OF THE INVENTION

1. Field of the Invention

This invention relates to fluid separation modules. In another aspect, the invention relates to fluid separation modules having tube sheets positioned in the end portions of the cylindrical shell forming the exterior of the separation module wherein the end portions of the cylindrical shell have been modified in order to provide improved adhesion and fluid seal between the tube sheets and the shell walls.

2. Prior Art

It is known to separate one fluid from a mixture of fluids by using a hollow fiber membrane or bundle of hollow fiber membranes which are more permeable to the one fluid than the other fluids of the mixture. The fluid mixtures are brought into contact with one side of the hollow fiber membranes, with a pressure differential being maintained across the membrane, and the permeable fluid will permeate the membrane to the other side thereof and thereby become separated from the fluid mixture.

Separation modules containing hollow fiber membranes are advantageous in view of the high ratio of membranes surface area per unit volume of the separation module which can be achieved. Consequently, separation modules containing hollow fiber membranes may be of sufficiently compact size to find desirable application for many fluid separation operations such as gas - gas, gas - liquid, and liquid - liquid (including liquid - dissolved solid) separations.

In these fluid separation modules, at least one end of each of the hollow fiber membranes is embedded (often commonly referred to as potted) in a tube sheet, and the hollow fiber membranes extend in a fluid communication relationship through the tube sheet. One purpose of the tube sheet is to ensure the hollow fiber membranes are in an essentially fluid tight relationship within the separation module. The tube sheet may be secured in an essentially fluid tight relationship in the separation module such that fluid does not pass from one of the exterior side or bore side to the other side of the hollow fiber membrane except through the wall of the membrane. Even small leakages around the tube sheet can significantly adversely affect the performance of the separation modules since non-permeating fluids can pass via these leakages to the permeate exit side of the hollow fiber membranes and reduce the selectivity of separation which can be achieved by the separation module. Another purpose of the tube sheet is to provide a significantly strong barrier to fluid flow that during operational conditions, the tube sheet does not rupture or otherwise lose its integrity such that fluid can pass through the tube sheet. In addition, the tube sheet cannot slip or be pushed by pressure differentials of operation. Therefore, the tube sheet is more often of substantial thickness in order to ensure achieving a fluid tight relationship with the hollow fiber membranes and to ensure that the tube sheet can withstand any pressure differentials to which it may be subjected during the intended separation operation.

The performance demanded of a tube sheet will depend upon the anticipated operating conditions of the separation module. Modules containing hollow fiber membranes have found acceptance for use in desalination, ultrafiltration, and hemodialysis. In general, these separation operations provide relatively mild environments, i.e., the process streams contain little, if any, concentrations of moieties which may adversely affect the material of the tube sheet, that is, by loss of physical strength, or integrity, or by swelling. Moreover, in operations such as hemodialysis in which little of any pressure differential is exerted across the tube sheet, the strength of the tube sheet is not a prime consideration. Accordingly, a wide freedom of choice exists in selecting the resin for fabricating the tube sheet. For example, the aspects of strength and chemical resistance can be sacrificed to avoid high polymerization temperatures (e.g., exotherms), in order to provide a desirable fluid liquid resin for penetration into the previously assembled bundle of hollow fiber membranes, and to ensure good adherence of the tube sheet to the hollow fiber membranes. Even with such modules which operate under relatively mild conditions, considerable difficulty may still be experienced in obtaining a suitable resin for forming a tube sheet. These difficulties clearly become more severe when the tube sheet must exhibit high strength and chemical resistance.

For instance, in view of the benefits which can be provided by fluid separations affected by membranes, it is desired to provide tube sheets which will enable separation module technology to be utilized in harsher environments such as gaseous purge streams and liquid waste streams from, e.g., chemical plants or refineries, which can contain moieties which are often deleterious to resinous materials. Such tube sheets should exhibit high strengths in order to withstand the high pressure differentials (often exceeding 30 or 40 or even 60 atmospheres) which may be required to obtain advantageous permeate flux through the walls of the hollow fiber membranes. Moreover, the tube sheet should retain its strength and dimensional stability over the long periods of operation which are desired for separation modules.

A wide variety of resins have been proposed for preparing tube sheets for hollow fiber membranes. For instance, Geary, et al, in U.S. Pat. No. 3,499,062, issued Mar. 3, 1970, suggest the use of solders, cements, waxes, adhesives, natural and synthetic resins. McLain in U.S. Pat. No. 3,422,008, issued Jan. 14, 1969, disclose the use of epoxy resins for forming tube sheets and suggest that phenol-aldehyde resins, melamine-aldehyde resins, thermosetting artificial rubbers, and acrylic resins may also be suitable. Other materials which have been disclosed for use as materials for forming tube sheets include urethane resins, silicone resins, polysulfides, acetals, cellulosics, fluorocarbons, vinyls, styrenes, polyethylene and polypropylene. More recently, U.S. Pat. No. 4,323,453, issued Apr. 6, 1982, discloses tube sheets having a plurality of hollow fiber membranes suitable for fluid separations which are adapted to provide a fluid tight relationship within a separation module comprised of a cured epoxy resin, for example, polyglycidyl resin and an imidazole curing agent.

Generally, tube sheets are fabricated using a resin, which may be a natural or synthetic resin. The resin can be applied to the hollow fiber membranes which are then assembled into a bundle or can be cast around a previously assembled bundle of hollow fiber membranes as a liquid and then solidified, e.g., by curing. Curing of the tube sheets which include a substantial volume of material generally results in shrinkage during-solidifying from the liquid state. These curing and shrinking tube sheets enhance the possibility of future fluid leakage around the peripheral of the tube sheet, i.e., between the tube sheet and the cylindrical shell in which the tube sheet is formed.

SUMMARY OF THE INVENTION

A fluid separation module for separating one fluid from a mixture of such one fluid and at least one other fluid is comprised of the module containing membranes in the form of hollow fibers having at least one end of the fibers protruding through a tube sheet which has been cast in place within a cylindrical shell having modified end portions. These cylindrical shell end portions have a plurality of spaced cuts extending longitudinally from the end of the shell to points spaced from the end of the shell with the cuts dividing the end of the shell into a plurality of tabs. The tube sheet which is formed of a curable polymeric material is cured in place within the end portion of the cylindrical shell with a bundle of hollow fibers positioned in the shell and extending through the tube sheet. The shell can be formed of a material which has sufficient flexibility that the tabs adhere to the tube sheet and flex inwardly as the polymeric material of the tube sheet is cured, thus forming a fluid tight seal. In another aspect, the shell interior end portion is provided with an internal taper, the taper converging in the direction away from the end of the shell. The fluid separation module according to the invention can have one or both shell end portions modified with tabs and taper if the use application of the fluid separation module requires, for example, bore side feed.

Generally, when epoxy resins in liquid form are introduced into the cylindrical shell end portion and by fluid flow allowed to encompass the hollow fiber membrane bundles, the epoxy shrinks if cured in place, thus leaving cracks between the tube sheet and the inner surface of the cylindrical shell. Such cracks either create or become a potential leak site. These curing problems have been solved by forming cuts from the end of the shell to drilled holes spaced around the peripheral of the cylindrical shell end portion, which are spaced from the end of the cylindrical shell, thus preventing propagation of the spaced cuts. The cylindrical shell end portion tabs which are formed by the cuts, constructed of suitable materials which allow some dimensional flex, allows for the tabs to flex inward and remain adhered to the tacky material which forms the tube sheet during the curing process. In addition, the internal taper of the end of the cylindrical shell portion, with the taper converging in a direction away from the end of the shell will prevent fluid pressure from pushing the tube sheet further into the shell, thus disrupting the tube sheet to shell seal or the dimensional stability of the separation module hollow fibers.

DETAILED DESCRIPTION OF THE INVENTION

Figure 1:
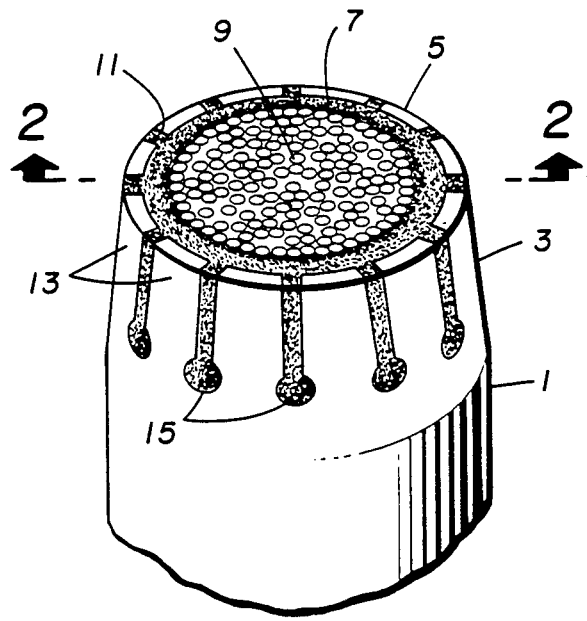
FIG. 1 is a perspective end view of a portion of the fluid separation module including the tube sheet and hollow fiber membranes contained therein, wherein the tube sheet is in place in the end of the cylindrical shell completing one end of the module.

Referring now in detail to the drawings, there is shown in FIG. 1 a fluid separation module 1 made up of a cylindrical shell 3 having an end 5 encompassing a tube sheet 7 having extending therethrough with open bores, hollow fiber membranes 9. The cylindrical shell 3 has spaced cuts 11 extending longitudinally from the end 5 to holes 15 creating tab elements 13. The material of construction of the cylindrical shell 3 and the creation of the tab elements 13 allows the in situ formation and curing of tube sheet 7 without forming separation of the continuity between the tube sheet 7 and cylindrical shell 3, i.e., tab elements 13 have sufficient flexibility such that the tab elements adhere to the tube sheet and flex inwardly as the polymeric material of the tube sheet is cured.

In FIG. 1, the spaced cuts 11 of the cylindrical shell 3 extend longitudinally from the end 5 of the cylindrical shell 3 to holes 15 which prevent propagation of the spaced cuts along the cylindrical shell 3 walls. In addition, the in situ curing of tube sheet 7 as a result of using a resin in liquid form to be placed into the end portion of the cylindrical shell 3 before curing provides a tube sheet which is sealably formed with the inwardly flexing tab elements 13. The cured resin penetration of portions of the tube sheet into the spaced cuts 11 and holes 15 adds further strength to the seal relationship.

Figure 2:
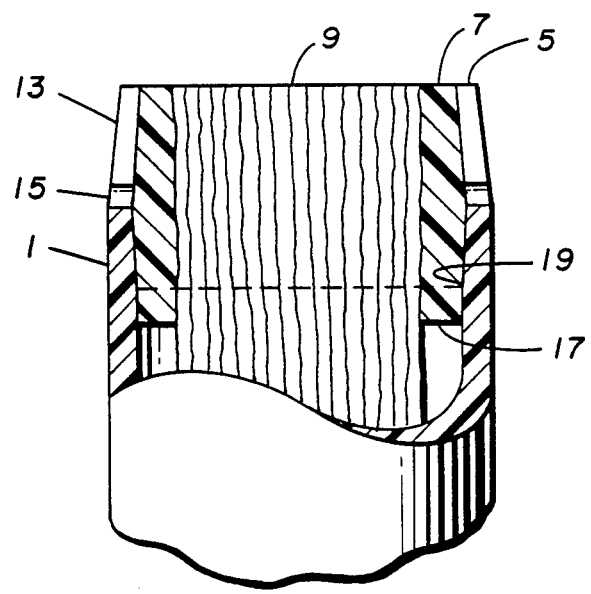
FIG. 2 is a cross-sectional view along line 2—2 of FIG. 1 showing the tube sheet and included hollow fiber membranes in place in the end portion of the cylindrical shell which has internal taper of the shell interior walls.

The cross-sectional view shown in FIG. 2 provides for an internal taper extending from the cylindrical shell end 5 to cylindrical shell wall thickness 19. The tube sheet 7 is shown in place with the tab elements 13 in contact with the tube sheet 7. The tube sheet 7 encompassing hollow fiber membranes 9 having open bore ends extends for a relatively short distance longitudinally along the interior of the cylindrical shell to a tube sheet internal end 17 which can be defined before the cylindrical shell wall thickness 19 is achieved or longitudinally internal of such shell wall thickness. The internal taper of the cylindrical shell tab elements 13 provides for a strengthened tube sheets' adherence to the cylindrical shell walls when pressure is applied to the end of the fluid separation module, i.e., bore feed conditions. This enforcement, in effect, prohibits the movement of the tube sheet longitudinally inwardly along the internal walls of the cylindrical shell.

In accordance with this invention the tube sheets containing the hollow fiber membranes as positioned in a sealed fashion within the end portion of the fluid separation module can be fabricated in place wherein a liquid resin material is fed into one or both ends of the fluid separation module with the hollow fiber bundles in place. For example, one tube sheet at a time can be formed by using gravity to act upon the liquid resin which results upon dispersion of the resin throughout the hollow fiber membranes and completely filling the end portion of the cylindrical shell which forms the exterior body of the fluid separation module inclusive of holes and spaced cuts. The liquid resin is then cured in place to solidify the resin, but due to shrinkage of the curing solid resin tab elements 13 of necessity flex slightly inward and maintain their contact with the tacky resin as the solid tube sheet is formed. Suitable means are available for covering and protecting the hollow fiber open bore ends during these procedures.

Generally, the liquid resins used require curing agents and can be controlled in regard to time and temperature in order to avoid undue penetration of the liquid resins through the holes and wall cuts as well as damaging the hollow fibers in those exothermic reactions reaching temperatures beyond the stability temperature of the polymeric materials forming the hollow fibers.

Optionally, the liquid resins should have a viscosity sufficient to maintain reinforcing filler in suspension for at least a time sufficient to form the liquid resin in substantially the shape of the tube sheet. Variation of amounts and curing agents for the liquid resin can manipulate the viscosity of the liquid resin to maintain the filler in suspension without undue settling prior to the remaining curing of the resin with other curing agents. Hence, the viscosity of the liquid resin may be sufficiently low in order to fabricate the tube sheet and the viscosity of the liquid resin can be quickly increased after the liquid resin has been placed into the form, i.e., the cylindrical shell end portion, to avoid undue settling of any fillers which are included.

The liquid resin may be formed into the tube sheet in any suitable manner as long as it is formed within the confines of the end portion of the cylindrical shell. For instance, the liquid resin can be placed on the end portions of a plurality of hollow fiber membranes and while still tacky and in an incomplete cured condition inserted into the cylindrical shell according to the invention which has a plurality of tabs and a tapered configuration for completion of the epoxy curing step. Preferably a bundle of membranes is positioned within the cylindrical shell of the module with means for protecting the open bore ends of the membranes and the liquid resin including curing agents and other fillers are introduced into the end portion of the cylindrical shell, thus allowing gravity to disperse the liquid resin material throughout the membrane bundle, resulting in a tube sheet as the resin is cured. This in situ forming of the tube sheet inclusive of open bore fibers, cylindrical shell tab elements, and cylindrical shell taper result in an essentially fluid impermeable enclosure cap which is adhered to the internal walls of the cylindrical shell forming an enclosure cap for the hollow fibers at the end of a fluid separation module. The resulting tube sheets have a plurality of hollow fiber membranes which are generally in parallel and extend longitudinally through the tube sheet. These hollow fiber membranes are embedded in a fluid tight relationship such that the bores of the hollow fiber membranes are in fluid communications through the tube sheet to the exterior of the fluid separation module. Conveniently, the cylindrical shell provides a cylindrical cross-section and the bundle of hollow fiber membranes substantially fills the cross-section of the cylindrical shell. However, other cross-sectional configurations may be suitable such as oval or the like.

The fluid separation module may be a single ended or double ended permeator, i.e., with tube sheets formed in one or both ends. The single ended fluid separation module has a tube sheet at only one end, and one or both ends of the hollow fiber membranes are embedded in the tube sheet. When only one end of each of the hollow fiber membranes is embedded in the tube sheet, the other end must be plugged or otherwise closed. In a double ended fluid separation module, a tube sheet is provided at each end of the cylindrical shell, and the hollow fiber membranes may extend from one tube sheet to the other tube sheet, or the modules may contain at least two distinct bundles of hollow fiber membranes where at least one bundle extends into only one tube sheet. In many instances, a single bundle of hollow fiber membranes is employed in a module and at least one end of the hollow fiber membranes in the bundle is embedded in a tube sheet. The opposite end of the hollow fiber membranes may be looped back, i.e., the bundle is generally in a "U" shape and embedded in the same tube sheet, or the opposite end of the hollow fiber membranes may be plugged or embedded in another tube sheet. In any case, the tube sheet must be maintained in essentially a sealed relationship such that the fluid communication between the regions of the separation module can only occur by passage of fluid through the bores of the hollow fiber membranes. The in situ formed tube sheets combined with the flexible tab elements provide a fluid tight relationship with respect to the tubular shell and the tube sheet without the use of sealing means positioned between the tube sheet and the cylindrical shell. Employment of resins for the tube sheet, materials for the cylindrical shell construction, the polymeric materials of the membranes, and various O-ring construction materials creates, for example, problems involved in varying degrees of thermal expansion. In field use applications versus storage conditions very significant changes in temperature occur thus creating stress regions because of different coefficients of expansion.

The in situ formed tube sheets wherein the tab elements adhere to the tacky epoxy resin during curing flex inward as the tube sheets shrink during curing provides for a fluid tight seal combination of cylindrical shell wall and tube sheet, thus avoiding many of the art known problems involved with multicomponent shell, tube sheet, and O-rings construction. In addition, the taper of the interior of the cylindrical shell end portion adds strength to the tube sheet cylindrical shell seal when the fluid separation module is used in applications where fluid pressure, i.e., bore feed creates pressure on the tube sheet. Such pressure in effect with the tapered interior cylindrical shell configurations would create an enhanced seal against fluid leaks.

We claim:

1. A fluid separation module, comprising:
   a. a cylindrical shell, said shell having in one end thereof a plurality of spaced cuts extending longitudinally from the end of the shell to points spaced from said end of said shell, said cuts dividing the end of the shell into a plurality of tabs;
   b. a tube sheet positioned in said end of said shell, said tube sheet being made from a curable polymeric material;
   c. a bundle of hollow fiber membranes positioned in the shell and extending through the tube sheet, said shell having sufficient flexibility that the tabs adhere to the tube sheet and flex inwardly as the polymeric material of the tube sheet is cured; and
   d. said cylindrical shell is provided with a plurality of spaced holes, said cuts terminating at said holes.

2. The apparatus of claim 1 wherein the end of the shell is provided with an internal taper, said taper converging in a direction away from the end of the shell.

3. The apparatus of claim 2 wherein said taper extends from the end of the shell to a location beyond said points.

4. The apparatus of claim 2 wherein the shell is made from a polymeric material and contains reinforcing elements in the form of glass fibers.

5. A fluid separation module comprising:
   a. a cylindrical shell, said shell having in both ends thereof a plurality of spaced cuts extending longitudinally from the ends of the shell to points spaced from each end of said shell, said cuts dividing the ends of the shell into a plurality of tabs;

b. tube sheets positioned in said ends of said shell, said tube sheets being made from a curable polymeric material;

c. a bundle of hollow fiber membranes positioned in the shell and extending through the tube sheets, said shell having sufficient flexibility that the tabs adhere to the tube sheets and flex inwardly as the polymeric material of the tube sheets is cured; and d. said cylindrical shell is provided with a plurality of spaced holes near the ends of the shell with said cuts terminating in said holes.

6. The apparatus of claim 5 wherein the ends of the shell are provided with internal taper, said taper converging in a direction away from the ends of the shell.

7. The apparatus according to claim 6 wherein said taper extends from the ends of the shell to a location beyond said points.

8. The apparatus of claim 6, wherein the shell is made from a polymeric material and contains reinforcing elements in the form of glass fibers.

* * * * *